US007690607B2

(12) United States Patent
Garmyn

(10) Patent No.: US 7,690,607 B2
(45) Date of Patent: Apr. 6, 2010

(54) BRACKET FOR MOUNTING A GUIDING RAIL

(75) Inventor: Tomas M. A. H. Garmyn, Willebroek (BE)

(73) Assignee: Hunter Douglas Industries BV, El Rotterdam (NL)

( * ) Notice: Subject to any disclaimer, the term of this patent is extended or adjusted under 35 U.S.C. 154(b) by 0 days.

(21) Appl. No.: 12/199,956

(22) Filed: Aug. 28, 2008

(65) Prior Publication Data

US 2009/0057512 A1 Mar. 5, 2009

(30) Foreign Application Priority Data

Aug. 29, 2007 (EP) ................................ 07016893

(51) Int. Cl.
*F16M 11/00* (2006.01)

(52) U.S. Cl. ................................ 248/201; 248/220.21

(58) Field of Classification Search ................ 248/201, 248/252, 254, 266, 267, 226.11, 220.21; 160/36

See application file for complete search history.

(56) References Cited

U.S. PATENT DOCUMENTS

| | | | | |
|---|---|---|---|---|
| 5,295,653 | A * | 3/1994 | Miyazaki et al. | 248/675 |
| 5,758,851 | A * | 6/1998 | Remmers | 248/251 |
| 7,267,311 | B2 * | 9/2007 | Jung | 248/266 |
| 2003/0127575 | A1 * | 7/2003 | Forbis | 248/251 |
| 2003/0221794 | A1 * | 12/2003 | Morris | 160/38 |
| 2005/0109902 | A1 * | 5/2005 | Wolfe et al. | 248/262 |

FOREIGN PATENT DOCUMENTS

| | | |
|---|---|---|
| CH | 461 072 | 8/1968 |
| DE | 26 08 271 A1 | 9/1977 |
| EP | 1 045 111 B1 | 3/2005 |
| FR | 2 266 790 | 10/1975 |
| FR | 2 826 048 A3 | 12/2002 |
| GB | 1 545 508 | 5/1979 |

* cited by examiner

*Primary Examiner*—Ramon O Ramirez
(74) *Attorney, Agent, or Firm*—Dorsey & Whitney LLP

(57) ABSTRACT

Bracket for mounting a guiding rail to a support surface. The mounting bracket includes a body part having a main body defining a mounting hole and opposite parallel first and second snap flanges. The bracket further has a clip part for engaging its body part and has at least one resilient tongue and at least one resilient arm extending from the clip part in alignment with the first and second snap flanges. The invention also relates to the combination of the mounting bracket and a guiding rail, as well as to a method for mounting a plurality of the brackets and the guiding rail to a mounting surface.

17 Claims, 5 Drawing Sheets

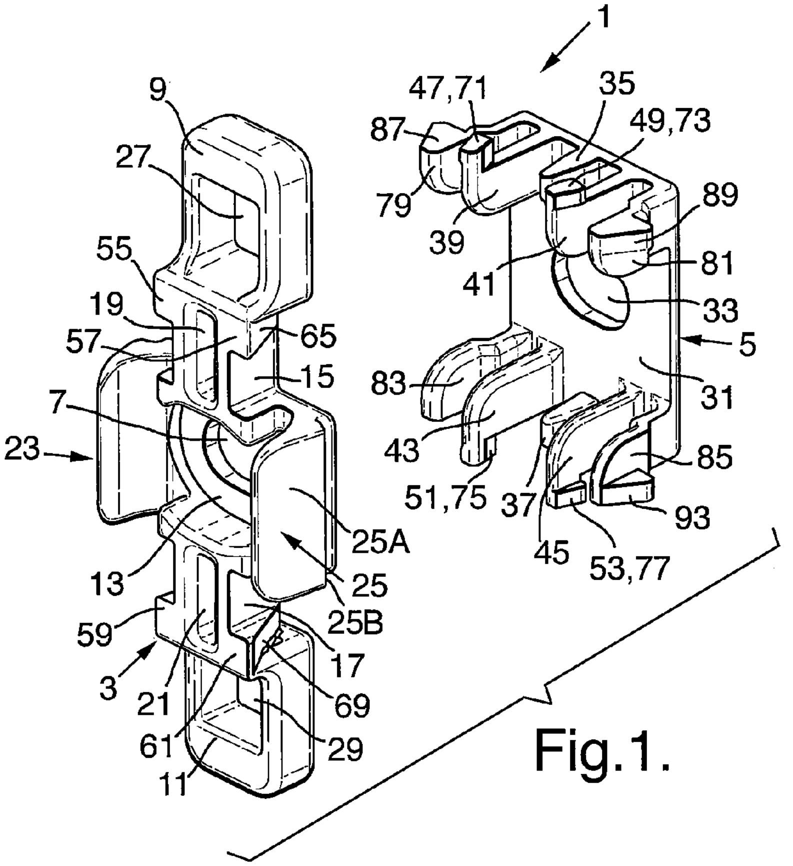
Fig.1.
Fig.2.
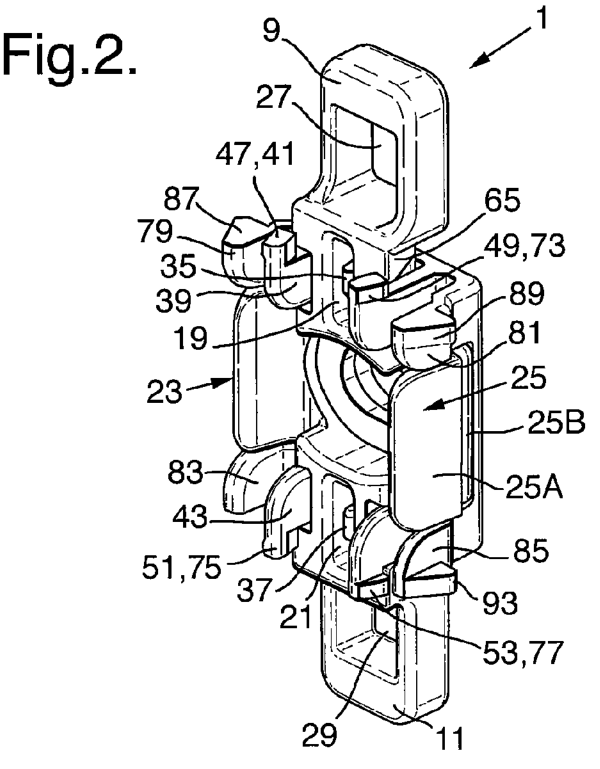

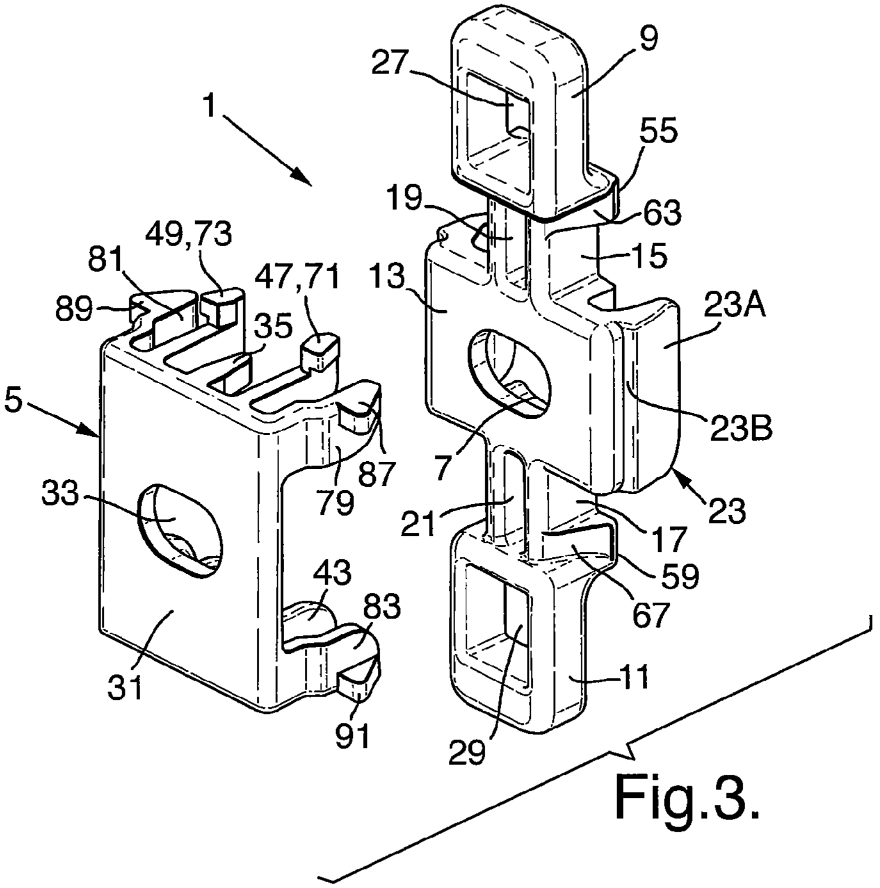
Fig.3.
Fig.4.
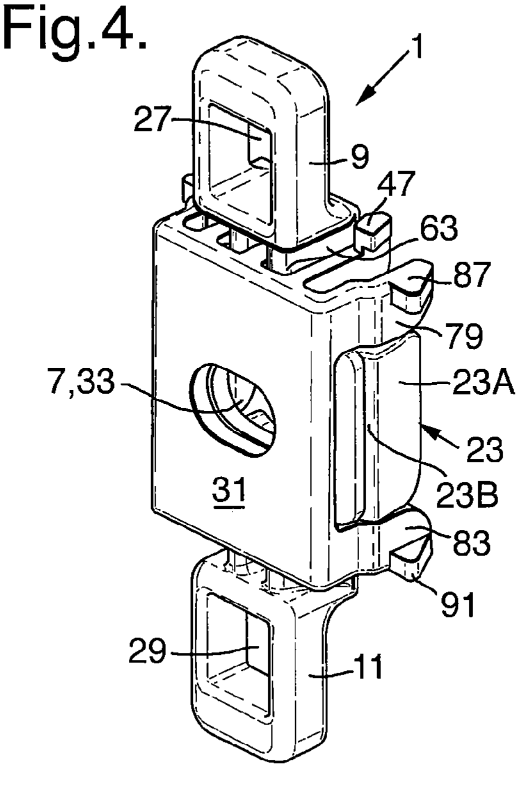

BRACKET FOR MOUNTING A GUIDING RAIL

CROSS REFERENCE TO RELATED APPLICATION

This application claims priority to European Patent Application No. 07016893.5 filed on 29 Aug. 2007, and such application is hereby incorporated by reference as if fully disclosed herein.

BACKGROUND OF THE INVENTION

1. Field of the Invention

The invention relates to a bracket for mounting a guiding rail for an architectural covering, such as a roller blind or screen.

2. Description of the Relevant Art

French patent document FR 2266790 discloses a mounting element for fixing to a surface surrounding an architectural opening. The known mounting element has clipping arms which can engage detent means on a guiding rail element. For this arrangement to be reasonably successful it has been necessary to provide the mounting element with a longitudinal length substantially similar to the length of the guiding rail. In the interest of material savings it has become popular to mount such guiding rails from a plurality of smaller brackets, rather than a single mounting element needing almost the same amount of material as the guiding rail. While the use of plural brackets has offered a more than adequate attachment for guiding rails, it has at times been somewhat more difficult to position and align such brackets prior to fixing these to a wall surface. This problem has been particularly apparent when three or more brackets are used in mounting a single guiding rail. Especially when an intermediate bracket is misaligned, it is either impossible to mount the guiding rail, or worse the guiding rail is warped upon mounting.

BRIEF SUMMARY OF THE INVENTION

Accordingly it is an object of the present invention to overcome or ameliorate at least one of the disadvantages of the prior art. It is also an object of the present invention to provide alternative structures which are less cumbersome in assembly and operation and which moreover can be made relatively inexpensively. Alternatively it is an object of the invention to at least provide the public with a useful choice.

To this end the invention provides a bracket for mounting a guiding rail to a support surface, the mounting bracket including a body part having a main body defining a mounting hole and opposite parallel first and second snap flanges; and a clip part for engaging the body part and having at least one resilient tongue and at least one resilient arm extending therefrom in alignment with the first and second snap flanges.

The invention also relates to the combination of the mounting bracket and a guiding rail, as well as to a method for mounting a plurality of the brackets and the guiding rail. The combination of the mounting bracket and guiding rail includes a length of guiding rail having a pair of parallel first and second mounting legs and a guide channel bounded by an exterior flange and an intermediate flange, the guiding rail being mounted to the mounting bracket by relevant ones of the first and second mounting legs, respectively engaging the first and second snap flanges. The method of mounting two or more of the mounting brackets to a mounting surface to receive a given length of guiding rail and to form the combination of the mounting bracket and a guiding rail, includes a first step of selecting the given length of guiding rail, a second step of selecting a number of mounting brackets in accordance with the given length of guiding rail, a third step of positioning the selected number of mounting brackets in spaced positions along the length of the given guiding rail and temporarily engaging one of the first and second mounting legs of the guiding rail between the at least one resilient tongue and at least one resilient arm of each mounting bracket, a fourth step presenting the temporarily attached mounting brackets to an intended position for final mounting on a mounting surface, a fifth step of marking the location for drilling holes to receive the relevant mounting fasteners for each mounting bracket, a sixth step of drilling the so marked holes, a seventh step of releasing the temporarily attached mounting brackets from the given length of guiding rail and mounting same with fasteners to the drilled holes, and an eight step of engaging the given length of guide rail, with its pair of first and second mounting legs onto the first and second snap flanges of each mounting bracket.

BRIEF DESCRIPTION OF THE DRAWINGS

The invention will now be described in reference to the accompanying drawings in which:

FIG. 1 is an exploded perspective view of the first and second bracket parts as seen from the front;

FIG. 2 is a perspective view from the front of the first and second bracket parts in assembled condition;

FIG. 3 is an exploded perspective view of the first and second bracket parts as seen from the rear;

FIG. 4 is a perspective view from the rear of the first and second bracket parts in their assembled condition;

DESCRIPTION OF THE PREFERRED EMBODIMENTS

Figure 5:
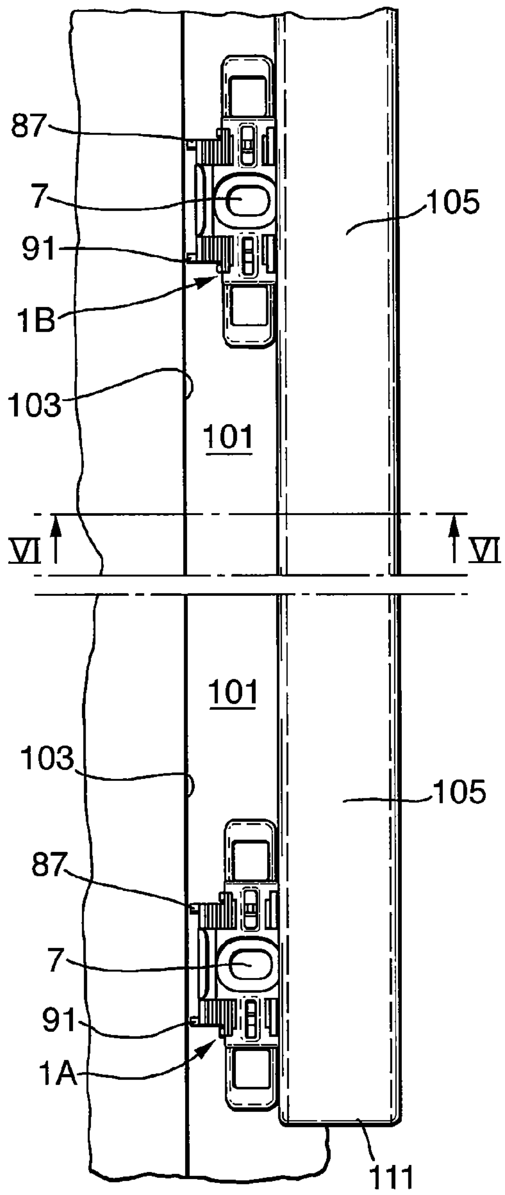
FIG. 5 is a frontal elevation of two brackets in position prior to, or during, their mounting to a recessed mounting surface.

Referring first to FIGS. 1 to 4, which show an embodiment of the mounting bracket 1 according to the invention, it is seen that the bracket 1 consists of a body part 3 and a clip part 5. The body part 3 has a mounting hole 7, to accept a mounting screw (not shown but conventional). The body part 3 further has first and second outer support legs 9, 11 connected to a main body 13 of the body part 3, which carries the mounting hole 7, by first and second transition portions 15, 17. Each of the respective first and second transition portions 15, 17 has a respective first or second central slot 19, 21. The main body 13 has opposite first and second snap flanges 23, 25. Each of the first and second snap flanges 23, 25 is formed by a sloped section 23A, 25A and a holding ridge 23B, 25B. The first and second outer support legs 9, 11 each have a respective first support leg aperture 27 and a second support leg aperture 29.

The clip part 5 has a web portion 31 which is provided with an opening 33, adapted to correspond in size and position to the mounting hole 7 of the body part 3. From the web portion 31 project first and second transverse locating projections 35, 37 which are engageable in the first and second central slots 19, 21 of the first and second transition portions 15, 17. The clip part 5 is further provided with opposite first to fourth flexible tongues 39, 41, 43 and 45 also projecting from the web portion 31. In use with the body part 3 and clip part 5 assembled, the flexible tongues are positioned oppositely alongside the first and second transition portions 15, 17. Each of the first, second, third and fourth flexible tongues 39, 41, 43 and 45 has a respective first to fourth retaining ledge 47, 49, 51, 53. These first to fourth retaining ledges 47, 49, 51, 53 each engage over a respective first, second, third and fourth support surface 55, 57, 59, 61 on the mounting bracket body part 3. To guide the respective retaining ledges 47, 49, 51, 53 of the flexible tongues 39, 41, 43, 45 onto the relevant support surfaces 55, 57, 59, 61, the support surfaces are each provided with a first ramp surface 63 (FIG. 3), a second ramp surface 65 (FIG. 1), a third ramp surface 67 (FIG. 3) and a fourth ramp surface 69 (FIG. 1). The first, second, third and fourth flexible tongues 39, 41, 43 and 45 are further provided with a respective outwardly directed first, second, third or fourth detent projection 71,73, 75,77 for a purpose later to be described. Also projecting from the web portion 31 in the same direction as the various other projections, is a set of first, second, third and fourth flexible arms 79, 81, 83 and 85. Outwardly projecting from each of the first, second, third and fourth flexible arms is a respective first, second, third or fourth distance element 87, 89, 91 or 93. These distance elements are provided for a purpose later to be described.

Figure 6:
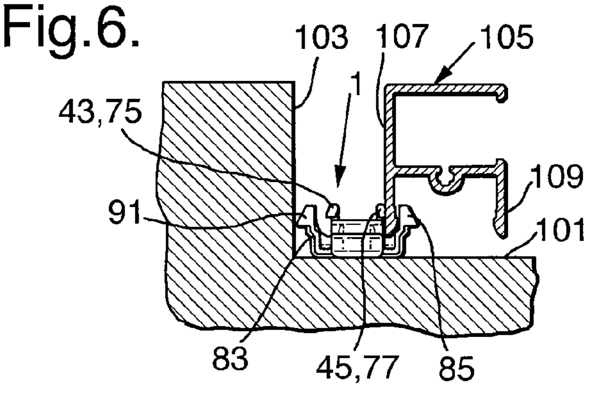
FIG. 6 is a view in the direction of the arrows VI-VI in FIG. 5.

FIGS. 5 and 6 illustrate a first step of mounting the brackets 1 to a mounting surface 101. Such a mounting surface 101 is usually vertically positioned in the vicinity of a window or other architectural opening. Moreover, as shown in FIG. 6, such a mounting surface 101 may be recessed, so as to define a boundary surface 103. FIGS. 5 and 6 also show a side guiding rail 105, but only in a temporary position, in which it is used to space and align the mounting brackets 1. When mounting side guiding rails on vertical wall surfaces of a building it is often problematic to correctly align and space the various mounting brackets used in the mounting of a single rail. It is therefore that the mounting bracket according to the invention is adapted to substantially simplify the alignment and positioning of a plurality of mounting brackets. As best seen in FIG. 6 the guiding rail 105 in cross-section has a pair of first and second mounting legs 107, 109 parallel to one another. With the arrangement described in reference to FIGS. 1-4, it has now become possible to temporarily clamp one of the first or second mounting legs. 107, 109 between the first and third flexible tongues 39, 43 and the first and third flexible arms 79, 83 or between the second and fourth flexible tongues 41, 45 and the second and fourth flexible arms 81, 85 of the clip part 5 of the mounting bracket 1. This results in the arrangement as shown in FIGS. 5 and 6, whereby several of a plurality of mounting brackets 1A, 1B can be spaced and clampingly positioned along the length of a guiding rail 105 intended to be eventually mounted on the brackets 1A, 1B once these have been properly attached to the wall surface 101. The mounting brackets 1A, 1B are temporarily held in position by friction provoked by the resiliency of the flexible tongues and arms helped by the relevant first, second, third and/or fourth detent projections 71, 73, 75 and/or 77. This greatly assists in accurately positioning the mounting brackets 1A, 1B on the mounting surface 101 and to ensure that these are properly aligned before fasteners are mounted to the holes 7. Once the brackets have been properly attached to the wall surface the guiding rail 105 can be taken from its temporary position and repositioned for proper and final mounting.

When the mounting brackets 1, 1A, 1B are to be mounted close to a boundary surface 103, such as also shown in FIGS. 5 and 6, then the first and third distance elements 87, 91 will ensure the proper distance of the mounting brackets from the boundary surface 103. It is convenient to position the lower most mounting bracket 1A level with the lower longitudinal end of the guiding rail 105 to have an accurate reference for the vertical position of the side guiding rails. Additionally, the side guiding rail can be provided with an end plug or end cap 111.

Figure 7:
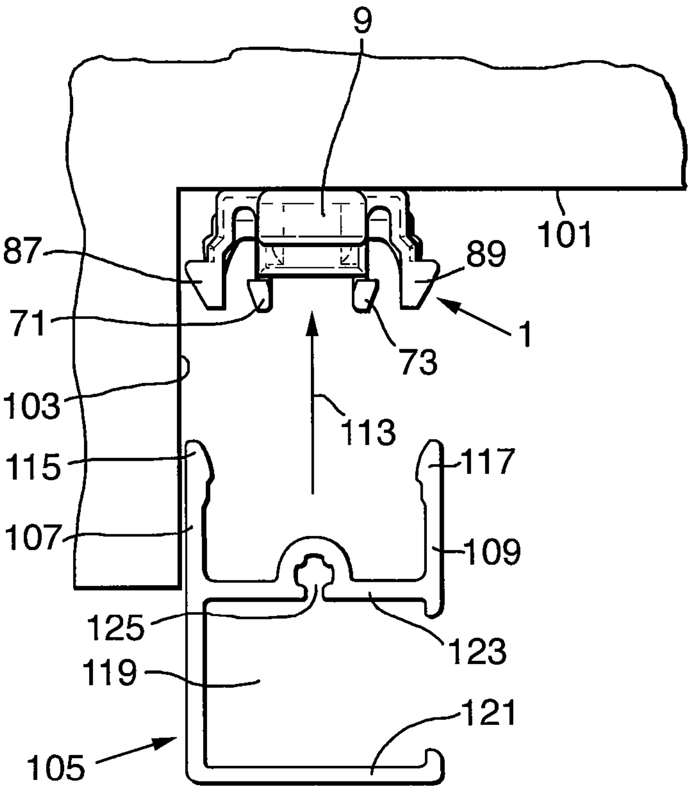
FIG. 7 is a top view of a bracket mounted to the recessed mounting surface and a side guide in position to be mounted to the bracket.
Figure 8:
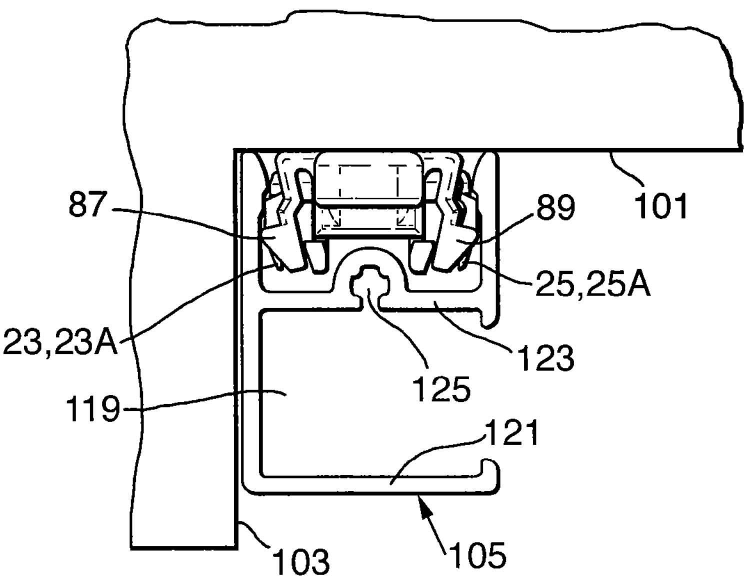
FIG. 8 is a top view similar to FIG. 7, but showing the side guide in its mounted position on the bracket.

Reference will now be made to FIGS. 7 and 8 which show the subsequent steps of mounting the guiding rail 105 onto the mounting bracket 1. The bracket 1, in FIG. 7, has been mounted to the vertical mounting surface 101 using the procedure of FIGS. 5 and 6. It is further seen that the distance element 87 has served to appropriately space the bracket 1 from the recess wall surface 103. The guiding rail 105 can now be positioned with its first mounting leg 107 snuggly against the recess wall surface 103. When the guiding rail 105 is now pushed in the direction of arrow 113, first and second detent portions 115, 117 will deflect the distance elements 87, 89 mounted on the flexible arms 79, 81 inwardly and allow the first and second detent portions 113, 115 of the guiding rail 105 to become engaged by the respective first and second snap flanges 23, 25 of the bracket 1. The guiding rail 105 will thereupon be retained in its mounted position as shown in FIG. 8.

Figure 9:
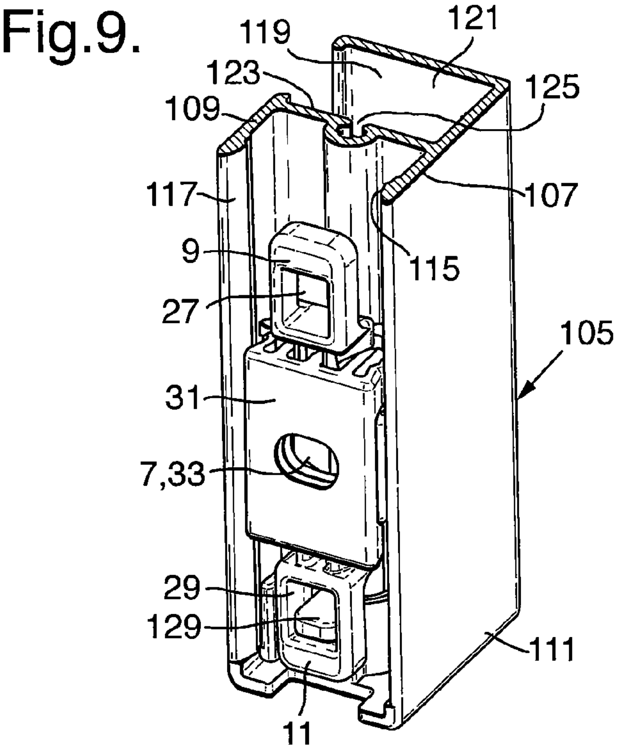
FIG. 9 is a perspective detail view of a lower end of the side guide channel as seen from an imaginary mounting surface.
Figure 10:
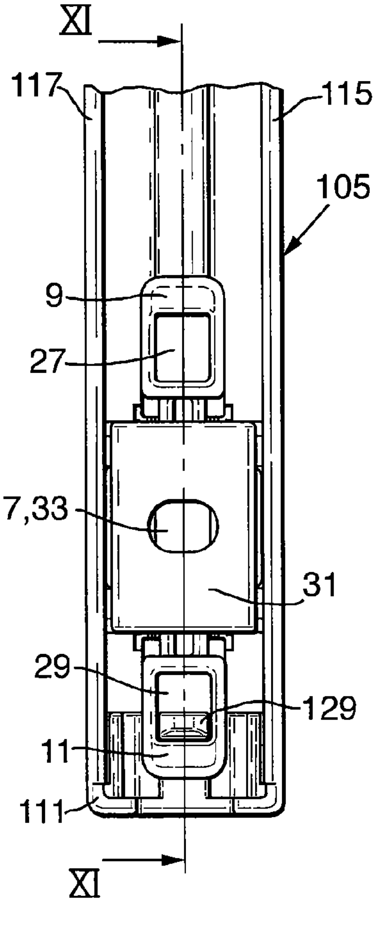
FIG. 10 is an elevation of the lower end detail view of the side guide channel viewed from a rear side with which it would normally be attached to a mounting surface.
Figure 11:
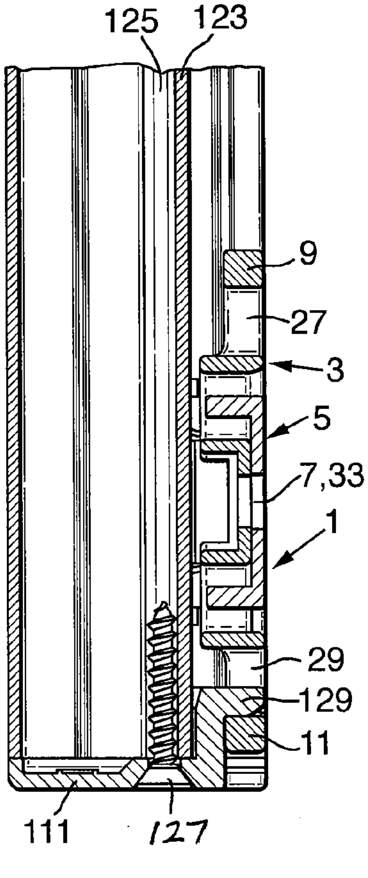
FIG. 11 is a transverse cross-section in the direction of the arrows XI-XI of FIG. 10.

A further feature of the invention is the end cap 111, already announced in FIG. 5, which will now be further explained in reference to FIGS. 9 to 11. Generally the guiding rail 105 includes a guide channel 119, which is bounded by an exterior flange 121 and an intermediate flange 123. To ensure that the guiding rail 105 is supported in a vertical direction, without totally relying on the friction between the mounting brackets 1 and the first and second detent portion 115, 117, the end cap 111 is arranged to co-operate with one of the mounting brackets 1, which is in a lower most position. The intermediate flange 123 is provided with a screw receiving formation 125, in which a screw fastener 127 (FIG. 11) can be engaged to firmly attach the end cap 111 to the guiding rail 105. The end cap 111 is also provided with an inwardly projecting hook portion 129 with which it can engage the second support leg aperture 29 of the second outer support leg 11. Thus a positive connection is established between the guiding rail 105 and the superimposed mounting hole 7 and opening 33 by which the mounting bracket 1 is fastened to a surface with another screw fastener (not shown but conventional).

It is thus believed that the operation and construction of the present invention will be apparent from the foregoing description. The invention is not limited to any embodiment herein described and, within the purview of the skilled person; modifications are possible which should be considered within the scope of the appended claims. Equally all kinematic inversions are considered inherently disclosed and to be within the scope of the present invention. The term comprising when used in this description or the appended claims should not be construed in an exclusive or exhaustive sense but rather in an inclusive sense. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Features which are not specifically or explicitly described or claimed may be additionally included in the structure according to the present invention without deviating from its scope.

The invention claimed is:

1. A mounting bracket for mounting a guiding rail to a support surface, the bracket including:

a body part having a main body defining a mounting hole and opposite parallel first and second snap flanges, a clip part for engaging the body part and having at least one resilient tongue and at least one resilient arm extending therefrom in alignment with the first and second snap flanges, said clip part further including a web portion defining a front side of said clip part, and wherein said body part further includes first and second outer support legs extending oppositely beyond the web portion.

2. Mounting bracket according to claim 1, wherein the first and second outer support legs are connected to the main body by respective first and second transition portions.

3. Mounting bracket according to claim 2, wherein the first transition portion has a first central slot and the second transition portion has a second central slot.

4. Mounting bracket according to claim 3, wherein the clip part has first and second transverse locating projections, extending from the web portion each engaging a respective one of the first and second central slots.

5. Mounting bracket according to claim 2, wherein the at least one resilient tongue is part of a set of first, second, third and fourth flexible tongues, wherein the first and second flexible tongues are positioned oppositely alongside the first transition portion and wherein the third and fourth flexible tongues are positioned oppositely alongside the second transition portion.

6. Mounting bracket according to claim 5, wherein each of the first, second, third and fourth flexible tongues has a respective one of a first, second, third and fourth retaining ledge extending from a free end of the relevant flexible tongue.

7. Mounting bracket according to claim 6, wherein the first transition portion has a first and a second support surface extending therefrom and the second transition portion has a third and fourth support surface extending therefrom and wherein the first, second, third and fourth retaining ledges are engaging a relevant one of the first, second, third and fourth support surfaces to hold the body part and the clip part together.

8. Mounting bracket according to claim 7, wherein each of the first, second, third and fourth support surfaces is joined to its relevant transition portion by a respective one of a first, second, third and fourth ramp surface to guide the respective retaining ledge onto its support surface during assembly of the body part and clip part.

9. Mounting bracket according to any of claim 1, wherein the at least one resilient arm is part of a set of first, second, third and fourth resilient arms, each associated with a relevant one of the first, second, third and fourth resilient tongues.

10. Mounting bracket according to claim 9, wherein the first and third resilient arms are oppositely aligned with the first snap flange and wherein the second and fourth resilient arms are oppositely aligned with the second snap flange.

11. Mounting bracket according to claim 9, wherein each of the first, second, third and fourth resilient arms are provided on their free end with a relevant one of a first, second, third and fourth outwardly directed distance element.

12. A mounting bracket for mounting a guiding rail to a support surface, the bracket including:

a body part having a main body with a front side and a rear side defining a mounting hole and opposite parallel first and second snap flanges extending from said front side, said main body being made of a rigid material and defining a rear side; and a clip part for engaging the body part and having at least one resilient tongue and at least one resilient arm extending therefrom in alignment with the first and second snap flanges, said clip part being relatively flexible relative to said body part and having a web portion defining a front side and wherein the front side of the web portion is superimposed on the rear side of the main body.

13. The combination of a mounting bracket and a guiding rail, said mounting bracket supporting said guiding rail on a support surface, the bracket including:

a body part having a main body defining a mounting hole and opposite parallel first and second snap flanges; and a clip part for engaging the body part and having at least one resilient tongue and at least one resilient arm extending therefrom in alignment with the first and second snap flanges, said guiding rail having a pair of parallel first and second mounting legs and a guide channel bounded by an exterior flange and an intermediate flange, the guiding rail being mounted to the mounting bracket by relevant ones of the first and second mounting legs, respectively engaging the first and second snap flanges.

14. The combination of claim 13, wherein at least one of the first and second outer mounting legs of the body part of the mounting bracket has at least one of a first and second support leg aperture, wherein the side guiding rail at a bottom end is provided with an end plug and wherein the end plug is provided with an inwardly projecting hook portion engageable with the at least one first and second support leg aperture.

15. A mounting bracket for mounting a guiding rail to a support surface, the bracket including:

a body part having a main body defining a mounting hole and opposite parallel first and second snap flanges, wherein each of said first and second snap flanges includes a sloped section extending from a free end of the relevant snap flange and forming a holding ridge intermediate of the relevant first and second snap flange; and a clip part for engaging the body part and having at least one resilient tongue and at least one resilient arm extending therefrom in alignment with the first and second snap flanges.

16. A mounting bracket for mounting a guiding rail to a support surface, the bracket including:

a body part having a main body defining a mounting hole and opposite parallel first and second snap flanges, said main body being made of a rigid material and defining a rear side; and a clip part for engaging the body part and having at least one resilient tongue and at least one resilient arm extending therefrom in alignment with the first and second snap flanges, said clip part being relatively flexible relative to said body part and having a web portion having an opening overlying said mounting hole and defining a front side and wherein the front side of the web portion is superimposed on the rear side of the main body.

17. A method of mounting at least two mounting brackets to a mounting surface to receive a given length of guiding rail to form the combination of claim 13, the method including:

a first step of selecting the given length of guiding rail, a second step of selecting a number of said mounting brackets in accordance with the given length of guiding rail, a third step of positioning the selected number of said mounting brackets in spaced positions along the length of the given guiding rail and temporarily engaging one of the first and second mounting legs of the guiding rail between the at least one resilient tongue and at least one resilient arm of each mounting bracket, a fourth step presenting the said temporarily attached mounting brackets to an intended position for final mounting on a mounting surface, a fifth step of marking the location for drilling holes to receive the relevant mounting fasteners for each mounting bracket, a sixth step of drilling the so marked holes, a seventh step of releasing the temporarily attached mounting brackets from the given length of guiding rail and mounting same with fasteners to the drilled holes, and an eighth step of engaging the given length of guide rail, with its pair of first and second mounting legs onto the first and second snap flanges of each of said mounting brackets.

* * * * *